United States Patent
Oh et al.

(10) Patent No.: US 7,605,610 B2
(45) Date of Patent: Oct. 20, 2009

(54) DIFFERENTIAL CURRENT DRIVING TYPE TRANSMISSION SYSTEM

(75) Inventors: Woon-Taek Oh, Chungcheongbuk-do (KR); Jong-Kee Kim, Chungcheongbuk-do (KR); Yoo-Chang Sung, Chungcheongbuk-do (KR)

(73) Assignee: MagnaChip Semiconductor, Ltd., Chungcheonbuk-do (KR)

( * ) Notice: Subject to any disclaimer, the term of this patent is extended or adjusted under 35 U.S.C. 154(b) by 0 days.

(21) Appl. No.: 11/411,571

(22) Filed: Apr. 25, 2006

(65) Prior Publication Data

US 2006/0238037 A1    Oct. 26, 2006

(30) Foreign Application Priority Data

Apr. 26, 2005 (KR) .................. 10-2005-0034614

(51) Int. Cl.
H03K 19/0175 (2006.01)
(52) U.S. Cl. .................. 326/86; 326/83; 327/108
(58) Field of Classification Search .................. 326/21, 326/30–31, 82–83, 86–87, 68, 112, 115, 326/121, 127, 26, 34; 327/108, 109, 53, 327/132; 375/219–220
See application file for complete search history.

(56) References Cited

U.S. PATENT DOCUMENTS

| | | | |
|---|---|---|---|
| 5,444,410 A | | 8/1995 | Polhemus |
| 5,778,204 A | | 7/1998 | Van Brunt et al. |
| 5,874,837 A | * | 2/1999 | Manohar et al. ............... 326/83 |
| 5,929,659 A | | 7/1999 | Pantelakis et al. |
| 5,977,796 A | | 11/1999 | Gabara |
| 6,313,662 B1 | * | 11/2001 | Ide ............................. 326/83 |
| 6,396,329 B1 | * | 5/2002 | Zerbe ......................... 327/336 |
| 6,590,422 B1 | * | 7/2003 | Dillon ......................... 326/86 |
| 6,593,801 B1 | | 7/2003 | Hattori |
| 7,176,709 B2 | * | 2/2007 | Uematsu ...................... 326/30 |

(Continued)

FOREIGN PATENT DOCUMENTS

JP     06-197047      7/1994

(Continued)

OTHER PUBLICATIONS

McCartney, R., et al. "9.3: WhisperBus: An Advanced Interconnect Link for TFT Column Driver Data," National Semiconductor, Inc. SID 01 Digest (undated); pp. 1-4.

*Primary Examiner*—Rexford N Barnie
*Assistant Examiner*—Christopher Lo
(74) *Attorney, Agent, or Firm*—Blakely, Sokoloff, Taylor & Zafman LLP (57) ABSTRACT

There is provided a differential current driving current type transmission system. The system includes a transmission line pair for transmitting a signal by a differential scheme; a transmission unit having a transmission circuit for making the transmission line pair have a current difference according to a logic value of a transmission signal and equalizing the transmission line pair at a predetermined timing, and a transmission controller for controlling the signal transmission of the transmission circuit and the equalization of the transmission line pair; and a receiving unit having an I-V converter circuit for mirroring a current difference of the transmission line pair and converting the current difference into a voltage difference, and a differential amplifier for amplifying the voltage difference of the I-V converter circuit.

30 Claims, 4 Drawing Sheets

U.S. PATENT DOCUMENTS

| | | | |
|---|---|---|---|
| 7,394,857 B2 * | 7/2008 | Maulik et al. | 375/257 |
| 2005/0110529 A1 * | 5/2005 | Pradhan et al. | 327/108 |
| 2005/0140424 A1 | 6/2005 | Uematsu | |
| 2007/0096777 A1 * | 5/2007 | Zhou et al. | 327/108 |

FOREIGN PATENT DOCUMENTS

| | | |
|---|---|---|
| JP | 09-018329 | 1/1997 |
| JP | 2000-059296 | 2/2000 |
| KR | 1020020034439 A | 5/2002 |
| TW | 556131 | 1/2003 |
| TW | 545016 | 8/2003 |

* cited by examiner

DIFFERENTIAL CURRENT DRIVING TYPE TRANSMISSION SYSTEM

FIELD OF THE INVENTION

The present invention relates to a data transmission system; and more particularly, to a differential current driving type data transmission system for transmitting a data by a differential current driving scheme.

DESCRIPTION OF RELATED ART

A conventional data transmission through a transmission line such as a lead wire or the like which exists between/among two semiconductor chips or more, is accomplished by converting a data into a voltage difference and loading the voltage difference into the transmission line at a transmitting side, and then converting the transmitted voltage difference into the original data again at a receiving side.

In case of the data transmission using the voltage difference, there exists a problem that it is inadequate for a relative long transmission line so that a data transmission type using the current has been proposed. The data transmission type using the current is a transmission type that a data signal is converted into a magnitude difference of the current to be outputted to the transmission line.

Regardless of a serial transmission/parallel transmission, the data transmission type using the current is mainly classified into a single current driving type and a differential current driving type according to the number of the transmission lines needed for transmitting one bit of data. In the single current driving type, one transmission line is allocated for one data so that the data is represented as the magnitude of the transmission line current. In the differential current driving type, the data is represented as a dominance of two transmission line currents by allocating the two transmission lines for one data.

The differential current driving type is a type that different currents flow through the two transmission lines and thus, a transmission signal is detected as a voltage difference at a receiving terminal of the transmission line. The differential current driving type has an advantage that the distortion of the transmission signal due to the noise is remarkably reduced in comparison with the single current driving type. On the contrary, an interference phenomenon between the transmission lines becomes more serious as the distance between the transmission lines are shorter. Resultingly, as components of R, L and C which are parasitic on the transmission line increase, the effect due to the noise and the interference between the lines becomes intensively strong. This causes the distortion of the transmission signal to become serious and the transition time of the signal to be long, which result in reducing the transmission speed after all.

In order to overcome the above problem of the prior art, the voltage difference is enlarged by supplying more amount of the current to the transmission line at the transmitting side for minimizing the deterioration of the transmission signal. However, this requires more power consumption, and also incurs a problem that electromagnetic interference (EMI) between the transmission lines increases as the transmission line current increases.

Meanwhile, a receiver of the conventional differential current driving type recovers the signal in virtue of the voltage difference generated by supplying the transmission current to a terminator resistor therein. As the resistance of the terminator resistor increases, the voltage difference increases so that it is easy to recover the signal. However, since a standard resistance of a general receiver is fixed to 50Ω from impedance matching relationship for maximum power transfer, it is impossible to arbitrarily enlarge the resistance of the terminator resistor in the receiver. In this case, only the way to enlarge the voltage difference is to enlarge the transmission current. However, the increase of the transmission current causes problems such as power consumption, degradation of the EMI characteristic.

Due to these problems, if the voltage difference itself generated by the terminator resistor is too small, sensitivity of the signal is deteriorated, and further an error may increase in recovering the signal. In this case, another method to enhance a recovering capability of the signal is to employ a high quality amplifier for amplifying the voltage difference generated by the terminator resistor. However, because it is inevitable that the high quality amplifier makes the overall circuit complicated, it provides demerits that the complexity of the overall circuit of the receiver increases, and a layout margin is degraded because it occupies large area on a substrate.

SUMMARY OF THE INVENTION

It is, therefore, an object of the present invention to provide a differential current driving type transmission system capable of reducing power consumption of a transmission unit.

It is another object of the present invention to provide a differential current driving type transmission system capable of preventing the deterioration of a transmission signal due to the interference between the transmission lines.

It is still another object of the present invention to provide a differential current driving type transmission system having a transmission unit capable of preventing the transmission speed from being reduced.

It is further another object of the present invention to provide a differential current driving type transmission system having a receiving unit in which error possibility is lowered in recovering a signal, and having high sensitivity with respect to the signal.

It is still further another object of the present invention to provide a differential current driving type transmission system having a receiving unit capable of securing a great margin to a layout.

In accordance with an aspect of the present invention, there is provided a transmitter for use in a differential current driving type system, including a current source block for supplying different current amount to a first and a second lines of a transmission line pair in response to a logic value of data transmitted through the first and the second lines; and a transmission controller for controlling the current source means.

In accordance with another aspect of the present invention, there is provided a receiver for use in a differential current driving type system, including a current mirror means for mirroring each currents on first and second lines of a transmission line pair to generating each mirrored current; a current-voltage converting means for converting each mirrored current to each corresponding voltage; and a data receiving means for comparing each corresponding voltage to generate a data corresponding to each currents on the first and the second lines.

In accordance with further another aspect of the present invention, there is provided a differential current driving type transmission system including: a transmission line pair for transmitting a signal by a differential scheme; a transmission unit including a transmission circuit for making the transmission line pair have a current difference according to a logic value of a transmission signal and equalizing the transmission line pair at a predetermined timing, and a transmission controller for controlling the signal transmission of the transmission circuit and the equalization of the transmission line pair; and a receiving unit including an I-V converter circuit for mirroring a current difference of the transmission line pair and converting the current difference into a voltage difference, and a differential amplifier for amplifying the voltage difference of the I-V converter circuit.

BRIEF DESCRIPTION OF THE DRAWINGS

The above and other objects and features of the present invention will become better understood with respect to the following description of the preferred embodiments given in conjunction with the accompanying drawings, in which.

DETAILED DESCRIPTION OF THE INVENTION

A differential current driving type transmission system in accordance with exemplary embodiments of the present invention will be described in detail with reference to the accompanying drawings.

Embodiment 1

Figure 1:
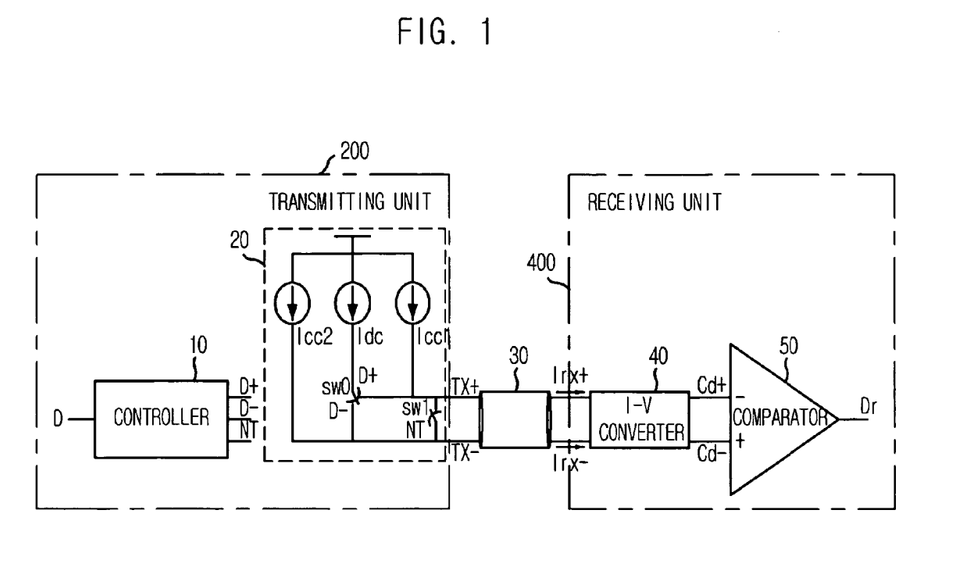
FIG. 1 is an overall block diagram of a transmission system in accordance with the present invention.
Figure 2:
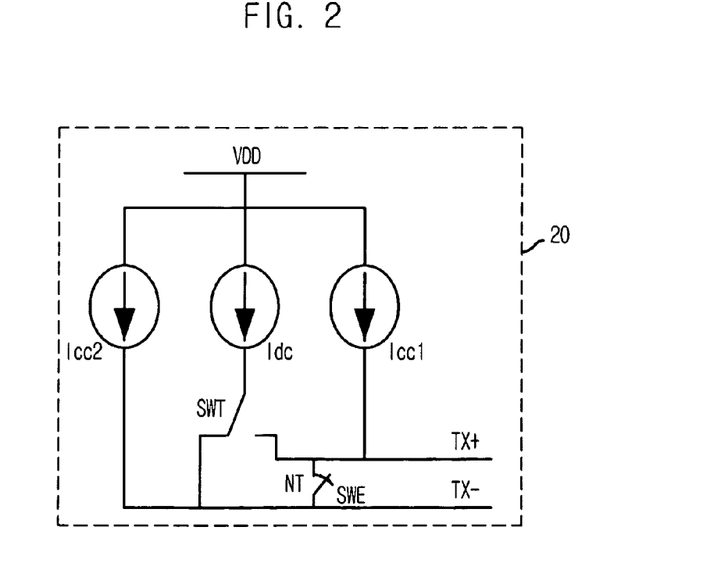
FIG. 2 is a circuit diagram setting forth a transmission circuit of the transmission system of FIG. 1.

A differential current driving type transmitter of the present invention, as illustrated in FIGS. 1 and 2, includes a first current source Icc1 for supplying a base current indicating a base logic state to a true line Tx+ of a transmission line pair; a second current source Icc2 for supplying a base current indicating a base logic state to a bar line Tx− of the transmission line pair; a transmission current source Idc for generating a transmission current indicating a transmission logic state to one of the transmission line pair; an equalizing switch SWE for equalizing potentials of the transmission line pair before transmitting data; a transition switch SWT for supplying the transition current to the true line Tx+ or the bar line Tx− according to a logic value of the data to be transmitted; and a transmission controller 10 for controlling switching operations of the equalizing switch SWE and the transition switch SWT corresponding to the data to be transmitted.

Figure 3:
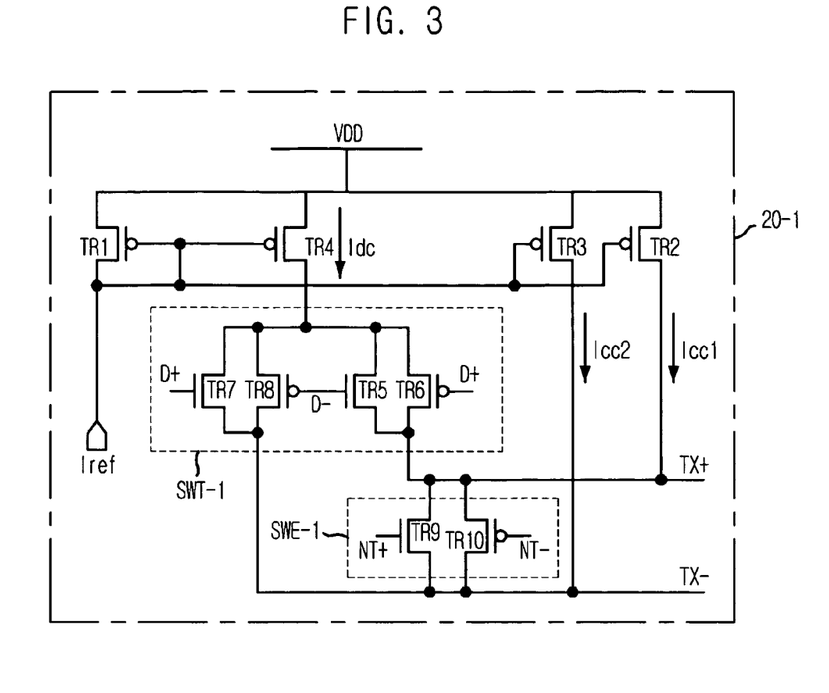
FIG. 3 is a detail circuit diagram setting forth the transmission circuit of FIG. 2 in accordance with one embodiment.
Figure 4:
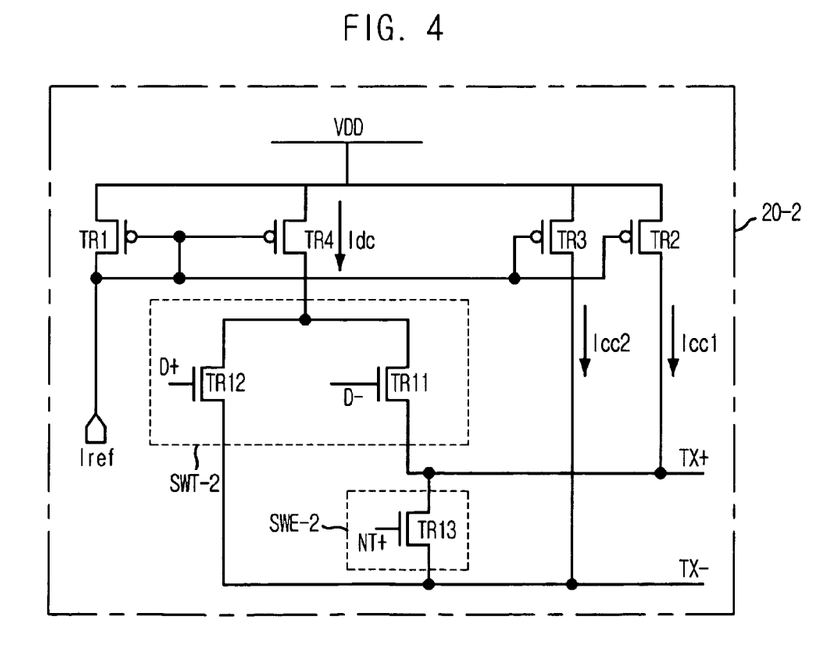
FIG. 4 is a detail circuit diagram setting forth the transmission circuit of FIG. 2 in accordance with another embodiment.

FIG. 3 is a detail circuit diagram setting forth a differential current driving type transmission circuit 20 configured with a plurality of MOS transistors in accordance with one embodiment. The first/second current sources Icc1 and Icc2 and the transition current source Idc are implemented as current mirror circuits. Each of the equalizing switch SWE-1 and the transition switch SWT-1 is configured with 2-MOS switch, i.e., one pair of complementary PMOS and NMOS transistors. Alternatively, each of the equalizing switch SWE and the transition switch SWT may be implemented as a single MOS switch SWE-2 and SWT-2, respectively, as shown in FIG. 4.

In order to embody the current mirror, the transmission circuit 20 includes a reference mirror MOS transistor TR1 through which a reference current flows. A source of the reference mirror MOS transistor TR1 is connected to a power supply voltage terminal VDD, and a drain and a gate are connected to an input terminal of the reference current Iref generated from an outside of the receiving unit. Thus, the reference current Iref generated from the outside of the transmission unit flows through a source-drain path of the reference mirror MOS transistor TR1.

The first current source Icc1 is configured with a first base mirror MOS transistor TR2 of which a source and a drain are connected to the power supply voltage VDD and the true line TX+, respectively, and a gate is connected to the gate of the reference mirror MOS transistor TR1. The second current source Icc2 is configured with a second base mirror MOS transistor TR3 of which a source and a drain are connected to the power supply voltage VDD and the bar line TX−, respectively, and a gate is also connected to the gate of the reference mirror MOS transistor TR1. In addition, the transition current source Idc is configured with a transition mirror MOS transistor TR4 of which a source and a drain are connected to the power supply voltage VDD and the transition switch SWT, respectively, and a gate is also connected to the gate of the reference mirror MOS transistor TR1.

Since all the gates of the first base mirror MOS transistor TR2, the second base mirror MOS transistor TR3, and the transition mirror MOS transistor TR4 are connected to the gate of the reference mirror MOS transistor TR1, the base current Icc1 and Icc2 and the transition current Idc are generated in proportion to the reference current Iref.

The transition switch SWT may be configured with a pair of MOS transistors TR5 to TR8 as shown in FIG. 3 or configured with a single MOS transistor TR11 and TR12 as illustrated in FIG. 4. In case of the former, the transition switch SWT-1 is provided with a first transition switch configured with a 2-MOS switch, receiving a transition signal D+ and an inversion transition signal D− through gates thereof, of which one ends are connected to the transition current source Idc and the other ends are connected to the true line TX+; and a second transition switch configured with a 2-MOS switch, receiving a transition signal D+ and an inversion transition signal D− through gates thereof, of which one ends are connected to the transition current source Idc and the other ends are connected to the bar line TX−.

In case of the latter, the transition switch SWT-2 is provided with a first transition switch device TR11 which is configured as a single MOS switch, receiving a transition signal D+ or an inversion transition signal D− through a gate thereof, of which one end is connected to the transition current source Idc and the other end is connected to the true line TX+; and a second transition switch device TR12, which is configured as a single MOS switch, receiving the transition signal D+ or the inversion transition signal D− through a gate thereof, of which one end is connected to the transition current source Idc and the other end is connected to a bar line TX−.

In case of the former, a transition switching control signal outputted from the transmission controller 10 has a positive control signal D+ and a negative control signal D−. Therefore, although there is a disadvantage that the constitutions of the transmission controller 10 and the transition switch SWT-1 are complicated, the former provides an advantageous merit that it is possible to secure accurate switching operation.

In case of the latter as shown in FIG. 4, a transition switching control signal outputted from the transmission controller 10 also has the positive control signal D+ and the negative control signal D−. But, the transition switch control signal may have only one control signal D if one of the two MOS transistors is configured as an NMOS transistor and the other one is configured as a PMOS transistor. Accordingly, there is an advantage that the constitutions of the transmission controller 10 and the transition switch SWT-1 can be simplified, but there is a demerit that asymmetric switching operation may be performed according to a signal state.

Likewise, the equalizing switch SWE may be configured with a pair of MOS switches, i.e., 2-MOS switch, as shown in FIG. 3, or a signal MOS transistor as illustrated in FIG. 4.

In case of the former, the equalizing switch SWE is configured with two MOS switches TR9 and TR10 receiving an equalizing signal NT+ and an inversion equalizing signal NT− through gates thereof, of which one ends are connected to the true line TX+ and the other ends are connected to the bar line TX−. In case of the latter, the equalizing switch SWE-2 is configured with a single MOS switch TR13 receiving an equalizing signal NT+ or an inversion equalizing signal NT− through a gate thereof, of which one end is connected to the true line TX+ and the other end is connected to the bar line TX−.

In the former case as illustrated in FIG. 3, the equalizing control signal outputted by the transmission controller 10 has the positive control signal NT+ and the negative control signal NT−. Therefore, although there is a disadvantage that the constitutions of the transmission controller 10 and the equalizing switch SWE-1 are complicated, the former case provides an advantageous merit that it is possible to secure accurate switching operation.

In the latter case as illustrated in FIG. 4, the equalizing switching control signal outputted from the transmission controller 10 has one control signal NT. Accordingly, there is an advantage that the constitutions of the transmission controller 10 and the equalizing switch SWE-2 are simplified, but there is a demerit that asymmetric switching operation may be performed according to a signal state.

Figure 5:
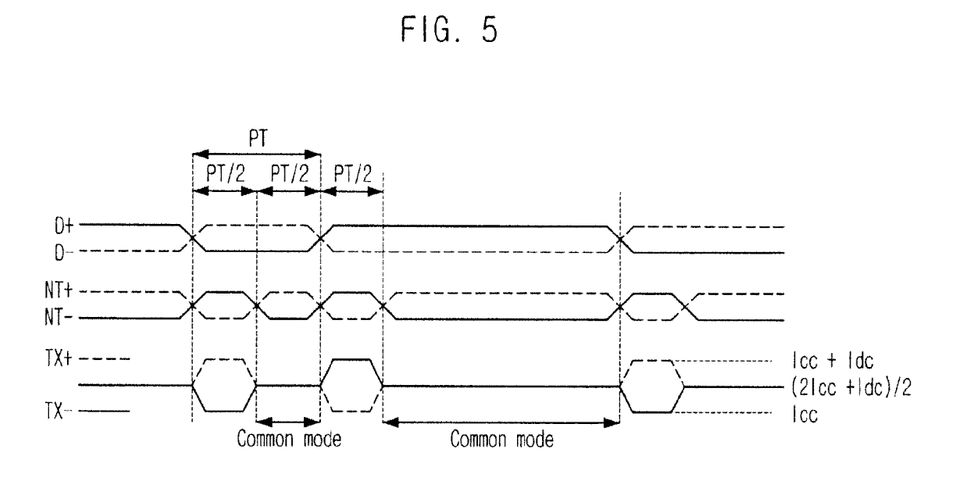
FIG. 5 is a timing diagram setting forth signals used for the transmission circuit of FIG. 2.

FIG. 5 illustrates switching control signals generated from the transmission controller 10 for controlling the differential current driving type transmission circuit 20 of FIG. 3 according to the input of the data signal.

The transition switching control signal D+ and D− changes its logic state according to the change of the data, and maintains the logic state corresponding to one data for a time period of 1PT. Meanwhile, if the transmission data bit is not changed, i.e., if the data bit is identical in logic value to a previous data bit, the previous logic state is still maintained.

The equalizing control signal NT+ and NT− enables a turn-off control signal of the equalizing switch SWE to be outputted for a time period of PT/2 incorporating a transition point of the data, while one piece of the data is being outputted to the transmission line by the transition switching control signal D+ and D−. Meanwhile, if the transmission data bit is not changed, a turn-on control signal of the equalizing switch SWE is outputted during the total time period of 1 PT.

This is because the equalization for the transmission line pair is performed in case of outputting the data bit signal which is identical in logic value to a previous data signal. However, according to another implementation, the equalizing switch SWE may be configured such that the turn-off control signal of the equalizing switch SWE is outputted for a time period of PT/2 incorporating a transition point of the data, while a corresponding data is being outputted to the transmission line, even though there is no change of the transmission data bit.

It is assumed that the current becomes larger when the transmission data bit is 1, and each current of the first and second current sources and the transition current source is equal to one another. The inversion transition signal D− and the transition signal D+ are outputted as logic low and logic high, respectively. Accordingly, the transition current of the transition current source Idc as well as the base current of the first current source Icc1 flows into the tine line Tx+. But, at this time, since the equalizing signal NT+ and the inversion equalizing signal NT− are changed to be logic low and logic high, respectively, at an initial transition time by means of the data bit, the true line TX+ and the bar line TX− are not connected to each other so that a predetermined current as much as the base current of the base current source flows through the bar line TX−, and the current which is two times or greater than the predetermined current flows through the true line TX+. After the lapse of the time period of PT/2, the equalizing signal NT+ and the inversion equalizing signal NT− become logic high and the logic low, respectively. Resultingly, there does not occur current difference between the two transmission lines.

Embodiment 2

Figure 6:
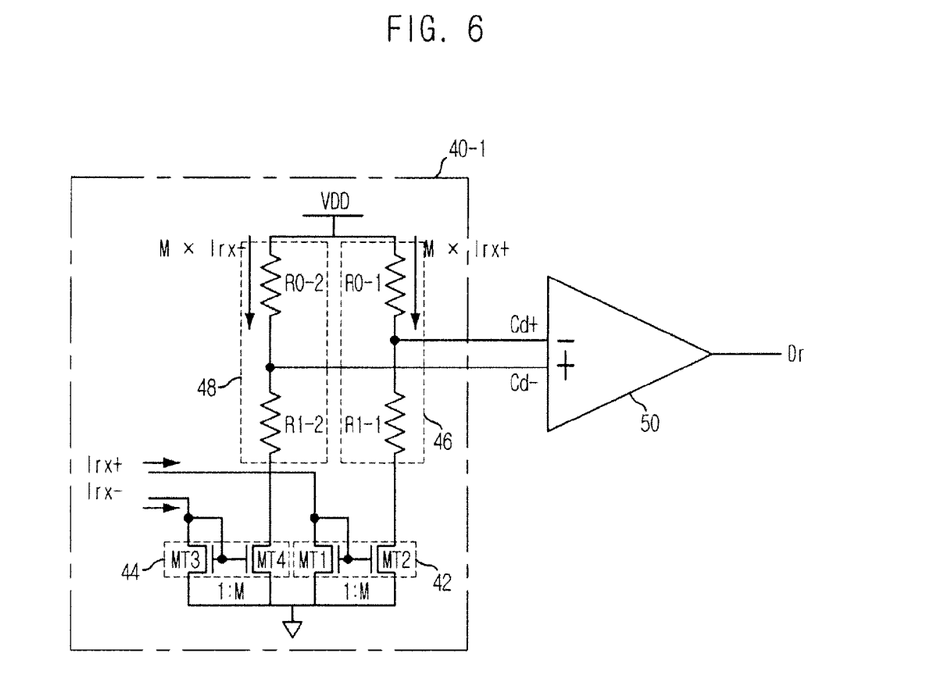
FIG. 6 is a detail circuit diagram setting forth a receiving unit of the transmission system of FIG. 1 in accordance with one embodiment.

The differential current driving type receiver includes: a true line current mirror 42 for generating a true line mirroring current M×Irx+ by mirroring a data signal current Irx+ flowing through the true line TX+ of the transmission line pair; a bar line current mirror 44 for generating a bar line mirroring current M×Irx− by mirroring a data signal current Irx− flowing through the bar line TX− of the transmission line pair; a true line current-voltage (I-V) converter 46 for generating a true line receiving voltage Cd+ having a level corresponding to the true line mirroring current M×Irx+; a bar line I-V converter 48 for generating a bar line receiving voltage Cd− having a level corresponding to the bar line mirroring current M×Irx−; and a differential amplifier 50 for amplifying a level difference between the true line receiving voltage Cd+ and the bar line receiving voltage Cd−.

The true line current mirror 42 includes: a first input terminal MOS transistor MT1 of which a gate and a drain are connected to the true line TX+ and a source is connected to a ground voltage terminal, for flowing the data signal current Irx+ which flows through the true line TX+; and a first output terminal MOS transistor MT2 of which a gate is connected to a gate of the first input terminal MOS transistor MT1 and a source is connected to the ground voltage terminal, for flowing the mirroring current therethrough by duplicating the current flowing through the first input terminal MOS transistor MT1.

The bar line current mirror 44 includes: a second input terminal MOS transistor MT3 of which a gate and a drain are connected to the bar line TX− and a source is connected to the ground voltage terminal, for flowing the data signal current Irx− which flows through the bar line TX−; and a second output terminal MOS transistor MT4 of which a gate is connected to a gate of the second input terminal MOS transistor MT3 and a source is connected to the ground voltage terminal, for flowing the mirroring current therethrough by duplicating the current flowing through the second input terminal MOS transistor MT4.

Herein, it is preferable that channel widths of the output terminal MOS transistors MT2 and MT4 be two times or greater than those of the input terminal MOS transistors MT1 and MT3 such that the mirroring current may be generated two times or larger than the current inputted through the transmission line, because this may improve an accuracy of following I-V conversion.

The true line I-V converter 46 includes: a first resistor R0-1 disposed on a current path of the true line mirroring current M×Irx+, of which one end is connected to the power supply voltage and the other end is connected to an output terminal of a true line conversion voltage; and a third resistor R1-1 disposed on a current path of the true line mirroring current M×Irx+, of which one end is connected to the output terminal of a true line conversion voltage and the other end is connected to the true line current mirror 42.

Likewise, the bar line I-V converter 48 includes: a second resistor R0-2 disposed on a current path of the bar line mirroring current M×Irx−, of which one end is connected to the power supply voltage and the other end is connected to an output terminal of a bar line conversion voltage; and a fourth resistor R1-2 disposed on a current path of the bar line mirroring current M×Irx−, of which one end is connected to the output terminal of a bar line conversion voltage and the other end is connected to the bar line current mirror 44.

In the receiver of FIG. 6, since a voltage drops across the first resistor R0-1, the third resistor R1-1, and the first output terminal MOS transistor MT2 in the current path of the true line mirroring current M×Irx+, and a derivation point of the voltage inputted into the differential amplifier 50 is a connection node between the first resistor R0-1 and the third resistor R1-1, the first resistor R0-1 is an essential element but the third resistor R1-1 is not an essential one so that it may be omitted if necessary.

In general, a resistor MOS transistor is used as a resistor element instead of a physical resistor in a circuit which may be embodied within a semiconductor device, because it is relatively cheaper than the physical resistor. Therefore, in the embodiment of the present invention, all or some of the first to fourth resistors may be configured with MOS transistors.

Figure 7:
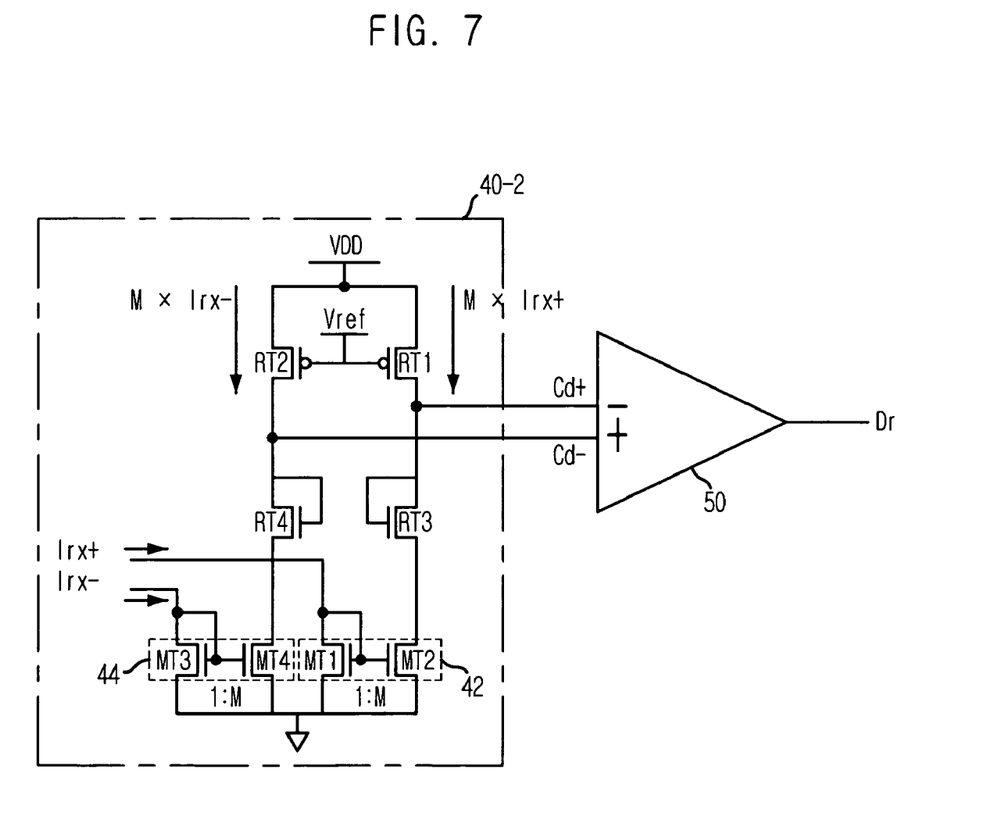
FIG. 7 is a detail circuit diagram setting forth a receiving unit of the transmission system of FIG. 1 in accordance with another embodiment.

Since the voltage drop should occur across the first and second resistors R0-1 and R0-2 according to the magnitude of the current, it is preferable that they are configured with MOS transistors to which a fixed bias voltage Vref is applied through a gate thereof. Therefore, the first resistor may be configured with a first resistor MOS transistor RT1 of which a source is connected to the power supply voltage terminal and a drain is connected to the output terminal of the true line conversion voltage. Likewise, the second resistor R0-2 may be configured with a second resistor MOS transistor RT2 of which a source is connected to the power supply voltage terminal and the drain is connected to the output terminal of the bar line conversion voltage. Herein, the bias voltage Vref is applied to gates of both the first resistor MOS transistor RT1 and the second resistor MOS transistor RT2.

The bias voltage Vref forces the first and second resistor MOS transistors RT1 and RT2 to operate in a linear region in I-V characteristic graph, and thus the first and second resistor MOS transistors RT1 and RT2 act as a kind of a resistor having a channel voltage drop in proportion to the magnitude of the current passing through channels. Since the first and second resistor MOS transistors RT1 and RT2 are configured as PMOS transistors as shown in FIG. 7, the bias voltage becomes VDD−Vt (Vt≦threshold voltage of PMOS transistor). That is, the gate voltage of the PMOS transistor is a voltage that the source voltage is dropped by a predetermined voltage which is slightly less than the threshold voltage. Therefore, it is possible to secure the linear operation of the PMOS transistor.

On the contrary, because the voltage drops are not essentially needed across the third and fourth resistors R1-1 and R1-2 according to the magnitude of the current, they may be embodied as MOS transistors to which the fixed bias voltage is applied through a gate thereof, or a diode-connected MOS transistor.

In case of the former, the third resistor R1-1 may be configured with a third resistor MOS transistor (not shown) receiving the bias voltage through a gate thereof, of which a source and a drain are connected to the true line current mirror 42 and the output terminal of the true line conversion voltage, respectively. The fourth resistor R1-2 may be configured with a fourth resistor MOS transistor (not shown) receiving the bias voltage through a gate thereof, of which a source and a drain are connected to the bar line current mirror 44 and the output terminal of the bar line conversion voltage, respectively.

In case of the latter, the third resistor R1-1 may be configured with a third resistor MOS transistor RT3 of which a source is connected to the true line current mirror 42, and a drain and a gate are connected to the output terminal of the true line conversion voltage. The fourth resistor R1-2 may be configured with a fourth resistor MOS transistor RT4 of which a source is connected to the bar line current mirror 44, and a drain and a gate are connected to the output terminal of the bar line conversion voltage.

Embodiment 3

A differential current driving type transmission system includes: a transmission line pair 30 for transmitting a signal by a differential scheme; a transmission unit 200 having a transmission circuit 20 for making the transmission line pair 30 have a current difference according to a logic value of a transmission signal and equalizing the transmission line pair 30 at a predetermined timing, and a transmission controller 10 for controlling the signal transmission of the transmission circuit 20 and the equalization of the transmission line pair 30; and a receiving unit 400 having an I-V converter circuit 40 for mirroring a current difference of the transmission line pair 30 and converting the current difference into a voltage difference, and a differential amplifier 50 for amplifying the voltage difference of the I-V converter circuit 40.

The transmission circuit 20 includes: a first current source Icc1 for supplying a base current indicating a base logic state to a true line TX+ of the transmission line pair 30; a second current source Icc2 for supplying a base current indicating a base logic state to a bar line TX− of the transmission line pair 30; a transmission current source Idc for generating a transmission current indicating a transmission logic state to one of the transmission line pair 30; an equalizing switch SWE for equalizing potentials of the transmission line pair 30 before transmitting data; and a transition switch SWT for supplying the transition current to the true line TX+ or the bar line TX− according to a logic value of the data to be transmitted. In this case, the transmission unit 200 configured with the transmission circuit 20 and the transmission controller 10 becomes identical to the transmitter of the first embodiment. Therefore, detailed descriptions for the first current source Icc1, the second current source Icc2, the transition current source Idc, the equalizing switch SWE, the transition switch SWT and the transmission controller 10 will be omitted herein.

The I-V converting circuit 40 may include: a true line current mirror 42 for generating a true line mirroring current M×Irx+ by mirroring a data signal current Irx+ flowing through the true line TX+; a bar line current mirror 44 for generating a bar line mirroring current M×Irx− by mirroring a data signal current Irx-flowing through the bar line TX−; a true line I-V converter 46 for generating a true line receiving voltage Cd+ having a level corresponding to the true line mirroring current M×Irx+; and a bar line I-V converter 48 for generating a bar line receiving voltage Cd− having a level corresponding to the bar line mirroring current M×Irx−. In this case, the receiving unit 400 configured with the I-V converting circuit 40 and the differential amplifier 50 is identical to the receiver of the second embodiment. Therefore, the detailed descriptions for the true line current mirror 42, the bar line current mirror 44, the true line I-V converter 46, the bar line I-V converter 48 and the differential amplifier 50 will be omitted herein.

In accordance with the differential current driving type transmission system of the present invention, the inventive system is effective for reducing power consumption in transmitting the data.

In addition, the present invention is effective for preventing the transmission signal from being deteriorated due to the interference between the transmission lines, and the transmission speed from being lowered.

Furthermore, in accordance with the differential current driving type receiver of the present invention, the inventive receiver is effective for lowering error possibility and enhancing sensitivity with respect to the signal.

Also, since the structure of the inventive receiver is simple, it is possible to provide a great margin to a layout.

The present application contains subject matter related to the Korean patent application No. KR 2005-0034614, filed in the Korean Patent Office on Apr. 26, 2005, the entire contents of which being incorporated herein by reference.

While the present invention has been described with respect to certain preferred embodiments, it will be apparent to those skilled in the art that various changes and modifications may be made without departing from the spirit and scope of the invention as defined in the following claims.

What is claimed is:

1. A transmitter for use in a differential current driving type system, comprising:
    a current source means for supplying different current amount to a first and a second lines of a transmission line pair in response to a logic value of data transmitted through the first and the second lines; and
    a transmission controller for controlling the current source means,
    wherein the current source means includes an equalizing switch for connecting the first line with the second line to equalize a first potential level of the first line and a second potential level of the second line
    wherein the transmission controller controls the equalizing switch to be turned off for a predetermined time when the data to be transmitted in a current data period is different from a previous data bit transmitted in a previous data period, to be turned on after the predetermined time, and to maintain turn-on during a time period that the logic value of the data to be transmitted is not changed.

2. The transmitter as recited in claim 1, wherein the current source means further includes:
    a first current source for supplying a first current to the first line;
    a second current source for supplying a second current to the second line;
    a transition current source for generating a transmission current indicating a logic state transition to one of the transmission line pair; and
    a transition switch for supplying the transition current to one of the transmission line pair according to the logic value of the data.

3. The transmitter as recited in claim 1, wherein the predetermined time is a PT/2 and the data period is a PT.

4. The transmitter as recited in claim 3, wherein the equalizing switch is turned off for PT/2 from a different data is inputted from a previous data bit.

5. The transmitter as recited in claim 2, further comprising a reference mirror MOS transistor of which a drain and a gate are connected to each other, enabling a reference current to pass therethrough, wherein the reference current is a basis for generating the base current and the transition current.

6. The transmitter as recited in claim 5, wherein the first current source is a first base mirror MOS transistor of which a source and a drain are connected to a power supply voltage and the true line, respectively, and a gate is connected to a gate of the reference mirror MOS transistor, and the second current source is a second base mirror MOS transistor of which a source and a drain are connected to the power supply voltage and the bar line, respectively, and a gate is connected to the gate of the reference mirror MOS transistor.

7. The transmitter as recited in claim 5, wherein the transition current source is a transition mirror MOS transistor of which a source and a drain are connected to the power supply voltage and the transition switch, respectively, and a gate is connected to the gate of the reference mirror MOS transistor.

8. The transmitter as recited in claim 2, wherein the transition switch comprises: a first transition switch configured with a 2-MOS switch, receiving a transition signal and an inversion transition signal through a gate thereof, of which one end is connected to the transition current source and the other end is connected to the true line; and a second transition switch configured with a 2-MOS switch, receiving a transition signal and an inversion transition signal through a gate thereof, of which one end is connected to the transition current source and the other end is connected to the bar line.

9. The transmitter as recited in claim 2, wherein the transition switch comprises: a first transition switch configured with a single MOS switch, receiving a transition signal or an inversion transition signal through a gate thereof, of which one end is connected to the transition current source and the other end is connected to the true line; and a second transition switch configured with a single MOS switch, receiving a transition signal or inversion transition signal through a gate thereof, of which one end is connected to the transition current source and the other end is connected to the bar line.

10. The transmitter as recited in claim 2, wherein the equalizing switch is configured with a 2 MOS switch, receiving an equalizing signal and an inversion equalizing signal through a gate thereof, of which one end is connected to the true line and the other end is connected to the bar line.

11. The transmitter as recited in claim 2, wherein the equalizing switch is configured with a single MOS switch, receiving an equalizing signal or an inversion equalizing signal through a gate thereof, of which one end is connected to the true line and the other end is connected to the bar line.

12. A differential current driving type transmission system, comprising:
    a transmission line pair for transmitting a signal by a differential scheme;
    a transmission unit including a transmission circuit for making the transmission line pair have a current difference according to a logic value of a transmission signal and equalizing the transmission line pair at a predetermined timing, and a transmission controller for controlling the signal transmission of the transmission circuit and the equalization of the transmission line pair; and a receiving unit including an I-V converter circuit for mirroring a current difference of the transmission line pair and converting the current difference into a voltage difference, and a differential amplifier for amplifying the voltage difference of the I-V converter circuit, wherein the transmission circuit includes an equalizing switch for connecting the transmission line pair to each other to equalize a first potential level of a true line and a second potential level of a bar line wherein the transmission controller controls the equalizing switch to be turned off for a predetermined time when the data to be transmitted in a current data period is different from a previous data bit transmitted in a previous data period, to be turned on after the predetermined time, and to maintain turn-on during a time period that the logic value of the data to be transmitted is not changed.

13. The differential current driving type transmission system as recited in claim 12, wherein the transmission circuit further comprises:
    a first current source for supplying a base current indicating a base logic state to the true line of the transmission line pair;
    a second current source for supplying a base current indicating a base logic state to the bar line of the transmission line pair;
    a transition current source for generating a transmission current indicating a transmission logic state to one of the transmission line pair; and
    a transition switch for supplying the transition current to the true line or the bar line according to a logic value of the data to be transmitted.

14. The differential current driving type transmission system as recited in claim 12, wherein the predetermined time is a PT/2.

15. The differential current driving type transmission system as recited in claim 14, wherein the equalizing switch is turned off for PT/2 from a different data is inputted from a previous data bit.

16. The differential current driving type transmission system as recited in claim 13, further comprising a reference mirror MOS transistor of which a drain and a gate are connected to each other, enabling a reference current to pass therethrough, wherein the reference current is a basis for generating the base current and the transition current.

17. The differential current driving type transmission system as recited in claim 16, wherein the first current source is a first base mirror MOS transistor of which a source and a drain are connected to a power supply voltage and the true line, respectively, and a gate is connected to a gate of the reference mirror MOS transistor, and the second current source is a second base mirror MOS transistor of which a source and a drain are connected to the power supply voltage and the bar line, respectively, and a gate is connected to the gate of the reference mirror MOS transistor.

18. The differential current driving type transmission system as recited in claim 16, wherein the transition current source is a transition mirror MOS transistor of which a source and a drain are connected to the power supply voltage and the transition switch, respectively, and a gate is connected to the gate of the reference mirror MOS transistor.

19. The differential current driving type transmission system as recited in claim 13, wherein the transition switch comprises: a first transition switch configured with a 2-MOS switch, receiving a transition signal and an inversion transition signal through a gate thereof, of which one end is connected to the transition current source and the other end is connected to the true line; and a second transition switch configured with a 2-MOS switch, receiving a transition signal and an inversion transition signal through a gate thereof, of which one end is connected to the transition current source and the other end is connected to the bar line.

20. The differential current driving type transmission system as recited in claim 13, wherein the transition switch comprises: a first transition switch configured with a single MOS switch, receiving a transition signal or an inversion transition signal through a gate thereof, of which one end is connected to the transition current source and the other end is connected to the true line; and a second transition switch configured with a single MOS switch, receiving a transition signal or inversion transition signal through a gate thereof, of which one end is connected to the transition current source and the other end is connected to the bar line.

21. The differential current driving type transmission system as recited in claim 13, wherein the equalizing switch is configured with a 2 MOS switch, receiving an equalizing signal and an inversion equalizing signal through a gate thereof, of which one end is connected to the true line and the other end is connected to the bar line.

22. The differential current driving type transmission system as recited in claim 13, wherein the equalizing switch is configured with a single MOS switch, receiving an equalizing signal or an inversion equalizing signal through a gate thereof, of which one end is connected to the true line and the other end is connected to the bar line.

23. The differential current driving type transmission system as recited in claim 13, wherein the I-V converting circuit comprises: a true line current mirror for generating a true line mirroring current by mirroring a data signal current flowing through a true line of a transmission line pair; a bar line current mirror for generating a bar line mirroring current by mirroring a data signal current flowing through a bar line of the transmission line pair; a true line I-V converter for generating a true line receiving voltage having a level corresponding to the true line mirroring current; and a bar line I-V converter for generating a bar line receiving voltage having a level corresponding to the bar line mirroring current.

24. The differential current driving type transmission system as recited in claim 23, wherein the true line current mirror and the bar line current mirror generate the mirroring currents which are two times or greater than the current to be mirrored.

25. The differential current driving type receiver as recited in claim 23, wherein each of the true line current mirror and the bar line current mirror comprises: an input terminal MOS transistor for making the current to be mirrored flow therethrough; and an output terminal MOS transistor for making the mirroring current flow therethrough, wherein an input terminal of the current to be mirrored is connected to a gate of each of the input and output terminal MOS transistors.

26. The differential current driving type transmission system as recited in claim 23, wherein the true line I-V converter disposed on a current path of the true line mirroring current, comprises a first resistor of which one end is connected to a power supply voltage and the other end is connected to an output terminal of a true line conversion voltage, and the bar line I-V converter disposed on a current path of the bar line mirroring current, comprises a second resistor of which one end is connected to the power supply voltage and the other end is connected to an output terminal of a bar line conversion voltage.

27. The differential current driving type transmission system as recited in claim 23, wherein the true line I-V converter disposed on the current path of the true line mirroring current, further comprises a third resistor of which one end is connected to the output terminal of the true line conversion voltage and the other end is connected to the true line current mirror, and the bar line I-V converter disposed on the current path of the bar line mirroring current, further comprises a fourth resistor of which one end is connected to the output terminal of the bar line conversion voltage and the other end is connected to the bar line mirror.

28. The differential current driving type transmission system as recited in claim 23, wherein the first resistor is configured with a first resistor MOS transistor receiving a bias voltage through a gate thereof, of which a source and a drain are connected to the power supply voltage and the output terminal of the true line conversion voltage, respectively, and the second resistor is configured with a second resistor MOS transistor receiving a bias voltage through a gate thereof, of which a source and a drain are connected to the power supply voltage and the output terminal of the bar line conversion voltage, respectively.

29. The differential current driving type transmission system as recited in claim 27, wherein the third resistor is configured with a third resistor MOS transistor receiving a bias voltage through a gate thereof, of which a source and a drain are connected to the true line current mirror and the output terminal of the true line conversion voltage, respectively, and the fourth resistor is configured with a fourth resistor MOS transistor receiving a bias voltage through a gate thereof, of which a source and a drain are connected to the bar line current mirror and the output terminal of the bar line conversion voltage, respectively.

30. The differential current driving type transmission system as recited in claim 27, wherein the third resistor is configured with a third resistor MOS transistor of which a source is connected to the true line current mirror, and a drain and a gate are connected to the output terminal of the true line conversion voltage, and the fourth resistor is configured with a fourth resistor MOS transistor of which a source is connected to the bar line current mirror, and a drain and a gate are connected to the output terminal of the bar line conversion voltage.

* * * * *

UNITED STATES PATENT AND TRADEMARK OFFICE
CERTIFICATE OF CORRECTION

PATENT NO. : 7,605,610 B2  Page 1 of 1
APPLICATION NO. : 11/411571
DATED : October 20, 2009
INVENTOR(S) : Oh et al.

It is certified that error appears in the above-identified patent and that said Letters Patent is hereby corrected as shown below:

Column 13, Claim 28, line 11, delete "23" insert -- 26 --

Signed and Sealed this

Thirteenth Day of July, 2010

David J. Kappos
*Director of the United States Patent and Trademark Office*